Feb. 18, 1964  J. D. MOZIC  3,121,838
SPEED CONTROL FOR GENERATORS
Filed July 25, 1960
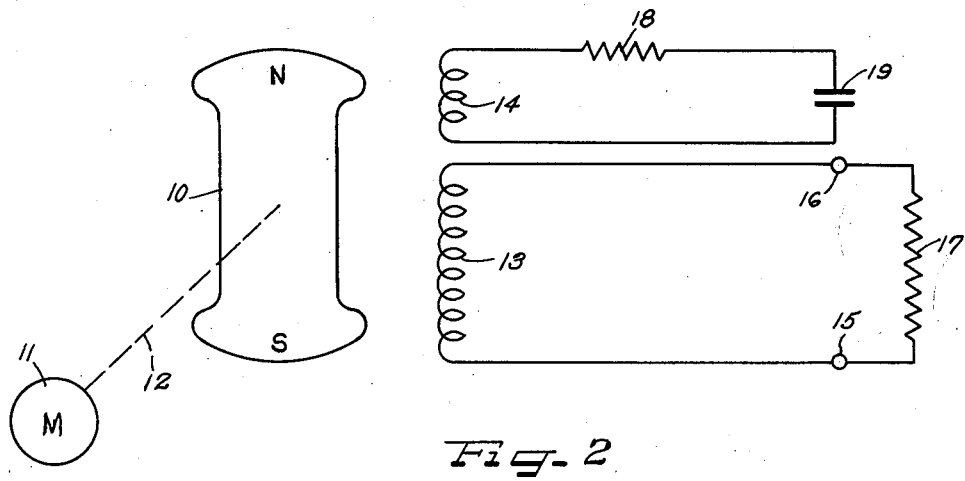
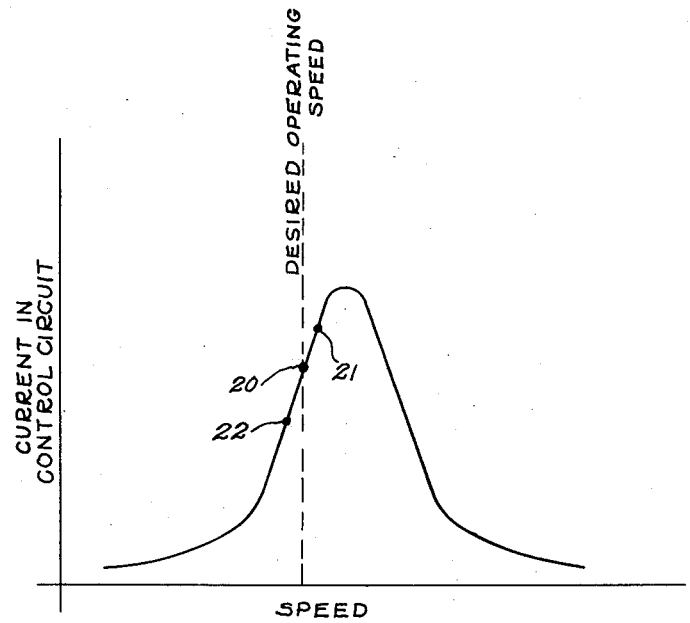
INVENTOR.
Joseph D. Mozic
BY
ATTORNEYS

# United States Patent Office 3,121,838
Patented Feb. 18, 1964

3,121,838
SPEED CONTROL FOR GENERATORS
Joseph D. Mozic, Cleveland, Ohio, assignor to Thompson Ramo Wooldridge Inc., Cleveland, Ohio, a corporation of Ohio
Filed July 25, 1960, Ser. No. 44,958
2 Claims. (Cl. 322—32)

This invention relates to control systems and, more particularly, to a system for controlling the speed of an alternating current generator.

Most loads that derive their electrical power from an alternating current generator require that the frequency and the magnitude of the voltage be relatively constant. Since both the magnitude of the output voltage and its frequency are directly proportional to the speed of the alternator, both of these factors will vary if the speed of the alternator is changed. Consequently, in applications where an essentially constant voltage and frequency is required, such as in missile power systems, some sort of a speed control system is necessary. In fact, this problem has been especially acute in missile applications because of the weight and size limitations placed on the missile components.

Accordingly, it is a primary object of this invention to provide an alternator that has a speed control means for maintaining the voltage and the frequency essentially constant regardless of a variation in the load or the input power.

It is another object of this invention to provide an alternator that has a speed control means that is very small and lightweight.

It is still another object of this invention to provide an alternator that has a speed control means which also serves as a parasitic load for excess energy in the system.

Other objects, features and advantages of the present invention will be apparent from the following detailed description taken in conjunction with the accompanying figures of the drawings, in which:

FIGURE 1 is a schematic illustration of an alternator having a speed control means constructed in accordance with the invention; and FIGURE 2 is a curve that illustrates the operation of the alternator shown in FIG. 1.

As shown on the drawing the alternator illustrated in FIGURE 1 is a rotating permanent magnet type that includes a rotatably mounted permanent magnet 10 that is coupled to a source of power such as a motor 11 by a shaft 12. Two windings, a load winding 13 and a control winding 14, are mounted on the alternator stator and inductively coupled with the permanent magnet 10. The load winding 13 is connected to two output terminals 15 and 16 which are also connected to a useful load 17. The control winding 14 is connected in series with a parasitic load resistor 18 and a capacitor 19.

For the purpose of analyzing the operation of the system shown, the control winding 14 can be considered as being the secondary winding of a transformer of which the load winding 13 is the primary winding. When the magnet 10 is rotated by the motor 11 a voltage is induced in the load winding 13 and current flows through it and the load 17. This current sets up a magnetic field which couples with the control winding 14 and induces a voltage in it. This voltage causes an alternating current to flow through the winding 14, the resistor 18 and the capacitor 19.

The components in the control winding circuit are chosen such that it forms a series resonant circuit at the desired operating speed and frequency. The proper values for these components can be easily determined by first measuring the inductance of the control winding 14 and then calculating the capacitance required from the formula:

$$f_0 = \frac{1}{2\pi\sqrt{LC}} \quad (1)$$

Here $f_0$ is the resonant or operating frequency, L is the inductance of the winding 14 in henrys, and C is the capacitance of the capacitor 19 in farads.

The manner in which the magnitude of the current flowing in the control winding circuit varies with changes in the speed of rotation of the magnet 10 is illustrated in FIGURE 2. The magnitude of the current in the control winding, considering it as being the secondary winding of a transformer, can be calculated from the equation:

$$I_s = \frac{-j\omega M I_p}{Z_s} \quad (2)$$

and the maximum possible secondary current will occur when $$\frac{(\omega M)^2}{R_s^2 + X_s^2} R_s = R_p \quad (3)$$

$$-\frac{(\omega M)^2}{R_s^2 + X_s^2} X_s = -X_p \quad (4)$$

Here $f_0$ is the resonant or operating frequency, L is the $2\pi f$, M is the mutual inductance of the windings 13 and 14, $I_p$ is the current flowing through the load winding 13, $Z_s$ is the series impedance of the control winding 14 circuit when considered by itself, $X_p$ and $X_s$ are the reactances of the primary and secondary circuits, respectively, $R_p$ and $R_s$ are the resistances of the primary and secondary circuits respectively. $I_s$ is the current flowing in the control winding 14, and $f$ is the frequency of the alternating current.

It can be seen from FIGURE 2 that, in the case of a coupled circuit where the primary is untuned and the secondary is tuned, the maximum secondary current does not occur at the resonant frequency of the secondary control circuit. The peak is shifted to a slightly higher frequency because the maxmium secondary current occurs when the secondary circuit is sufficiently detuned that the reactance that is coupled into the primary circuit neutralizes the reactance of the primary circuit. An inductive primary circuit neutralizes some of the inductance in the secondary and, consequently, raises the resonant frequency.

When an alternator that has a control circuit constructed in accordance with the invention is operating under normal conditions the rate of rotation of the permanent magnet 10 will be at the desired operating speed and the current flowing through the control winding circuit will be at point 20 on the curve shown in FIGURE 2. If an excess amount of energy is suddenly introduced into the system, which can be caused either by a sudden lessening of the load 17 or by a sudden increase in the amount of power delivered by the motor 11, the rate of rotation of the permanent magnet 10 will tend to increase. A slight increase in the speed will cause the magnitude of the current flowing in the control winding circuit to increase to the point 21 on the curve, and conversely, if a deficient amount of energy is in the system, the rate of rotation of the permanent magnet 10 will tend to decrease and cause the magnitude of the current in the control winding circuit to also decrease to the point 22. It can be seen that a very slight increase or decrease in the operating speed of the alternator will have a magnified effect on the current in the control winding circuit. It can also be seen that excess energy in the system will be dissipated in the parasitic load resistor 18 in the control winding circuit and the tendency of the rotor to increase its speed will be minimized. And, if the amount of energy in the system is deficient, the amount of power dissipated by the parasitic load resistor 18 will decrease. Therefore, the amount of power dissipated by the parasitic load resistor 18 will be directly proportional to the frequency deviation of the alternator and its speed will be maintained essentially constant.

While the rotating member in the alternator has been shown as being a permanent magnet, it is obvious that an electromagnet that is powered by a direct current source can also be used. In some instances it may be useful to make the capacitor 19 variable.

It is apparent that a novel and useful alternating current generator having a speed control means has been provided. Such an alternating current generator is very advantageous since the speed control means also includes means for absorbing any excess energy introduced into the system. Other advantages are achieved because of the fact that such a system is extremely small in terms of size and weight and it is also exceptionally reliable.

It will be apparent that many modifications and variations may be effected without departing from the scope and novel concepts of the present invention.

I claim as my invention:

1. An alternating current generator comprising a load winding, a magnetic rotor positioned in inductively coupled relation to said load winding, a control winding inductively coupled to said load winding, a parasitic resistor and a capacitance connected to said control winding to form a series resonant circuit therewith, said control winding and said capacitor defining a resonant circuit at a predetermined rotation speed of said rotor, said resonant circuit being sufficiently sharply resonant so that there is a large change in current in said control winding upon incremental change of speed of said rotor.

2. The generator of claim 1 in which said rotor is composed of a permanent magnet.

References Cited in the file of this patent
UNITED STATES PATENTS

| | | |
|---|---|---|
| 1,473,900 | Bushnell | Nov. 13, 1923 |
| 2,218,859 | Schweitzer | Oct. 22, 1940 |
| 2,509,662 | Wisman | May 30, 1950 |